United States Patent [19]

Valkenburg et al.

[11] Patent Number: 4,851,277
[45] Date of Patent: Jul. 25, 1989

[54] COMPOSITE MATTING WITH REINFORCEMENT

[75] Inventors: Brand C. Valkenburg, Bennekom; Stephanus A. G. de Graaf, Wolfheze, both of Netherlands; Joachim Böhler, Wörth am Main; Rolf Vollbrecht, Obernburg, both of Fed. Rep. of Germany

[73] Assignee: AKZO NV, Arnhem, Netherlands

[21] Appl. No.: 125,708

[22] Filed: Nov. 27, 1987

[30] Foreign Application Priority Data

Nov. 27, 1986 [DE] Fed. Rep. of Germany ....... 3640580

[51] Int. Cl.$^4$ ............................................. B32B 3/28
[52] U.S. Cl. .................................... 428/167; 156/71; 428/172; 428/226; 428/227; 428/228; 428/288; 428/296
[58] Field of Search ............... 428/167, 172, 226, 227, 428/228, 288, 296; 156/71

[56] References Cited

U.S. PATENT DOCUMENTS 3,949,129 4/1976 Hubbard ............................. 428/190
4,342,807 8/1982 Rasen et al. ......................... 428/180

Primary Examiner—Marion C. McCamish
Attorney, Agent, or Firm—Oliff & Berridge

[57] ABSTRACT

Composite matting comprises a matting web with a peak-and-valley structure and a reinforcement in the form of a filament and/or ribbon system, which is used as a supporting base for the coating of walls. The reinforcement consists of glass filaments, aramide filaments, silica filaments, metal or synthetic polymer filaments and/or ribbons and acts in the direction of loading, during which it either prevents a change in shape or is limited to a prefixed mass in order to adjust the thickness of the composite matting.

16 Claims, 1 Drawing Sheet

COMPOSITE MATTING WITH REINFORCEMENT

BACKGROUND

The present invention relates to a composite matting consisting of a matting web with a peak-and-valley structure and a reinforcement.

Such composite mattings are known, for instance, for lawn surfaces as drainage structures, filter mats or soil retention mats to protect against erosion from U.S. Pat. No. 4,342,807.

SUMMARY OF THE INVENTION

An object of the present invention is to provide a similar type of composite matting that is suitable for use as a supporting base for the coating of preferably non-horizontal walls.

In accordance with the invention, this and other objects are achieved with a composite matting of the aforementioned type in which, for the use of this composite matting as a supporting base for a coating of walls in a non-horizontal arrangement, the reinforcement consists of at least one filament and/or ribbon system, whereby—in each case referred to the cross section—the tensile strength and/or resistance to deformation is greater than the tensile strength and/or resistance to deformation of the matting web and the reinforcement is attached in force-locked manner to the matting web at least at individual points.

The reinforcement is attached pointwise to the matting web if adhesive joints, welds, seams, staplings or the like are provided locally at the points of contact with the matting web.

DETAILED DESCRIPTION OF PREFERRED EMBODIMENTS

Figure 1:
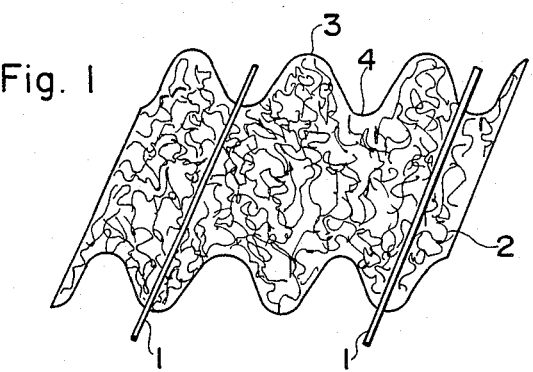
FIGS. 1-3 are schematic, perspective views of three embodiments of the invention.

Within the meaning of this application, walls refer to all substantially non-horizontally extending walls such as, for example, building walls, facades, partition walls, protective and shaft walls, walls of containers, pipes and the like.

Within the meaning of this application, coating compounds refer to all plasters, anti-corrosion agents, mastics, insulating compounds, sound-insulating compounds, foams, resins, plastics and the like.

The matting web of peak-and-valley structure may consist, in accordance with said U.S. patent, of a plurality of filaments of synthetic polymers which intersect one another of individual points and are bonded together at their points of intersection. It is also possible for the matting web to consist of a compression-molded fabric which may have been impregnated with synthetic resin prior to compression molding in order to ensure shape retention after solidification. Similarly, the matting web may be formed by an appropriately shaped foil which may be provided with openings for improved location of the coating compound.

When using the matting web of peak-and-valley structure as a supporting base for the coating of walls, a reliable application of the coating compound is possible even without special pretreatment of the surface which is to be coated. To do this, the matting web is fastened to the wall which is to be coated by suitable fastening elements such as, for instance, screws, bolts or clamps, and it serves as a supporting base for the coating compound which is to be applied. The cavities formed by the plurality of synthetic polymer filaments, which intersect one another at the points of intersection, form together with the peak-and-valley structure of the matting web, a three-dimensional surface structure on which the coating compound is supported over at least a substantial portion of the thickness of application.

However, the relatively poor inherent stability of the prior art matting web has the result, in many cases, that the matting web stretches below its attachment upon application or introduction of the coating compound. This effect, which is primarily caused by the weight of the coating compound, leads to bulges in the matting web in those sections that are not fixed and thereby leads to an uneven shape of the surface. This leads also to the formation of undesired cavities within the coating compound during the drying phase, which will result in cracks in the finished coating surface.

The composite matting having a reinforcement consisting of a wire grid also mentioned in U.S. Pat. No. 4,342,807 has, to be sure, a sufficient inherent stability, but is difficult to handle when used for large sufaces on account of its stiffness.

In addition, the corrosion resistance is insufficient for many applications.

In accordance with the invention, handling is improved by using a reinforcement consisting of at least one filament and/or ribbon system which is arranged such that the tensile strength and/or resistance to deformation of the matting web is increased in the direction of loading, while that advantageous low density is more or less maintained.

For this purpose, it would be best, in order to achieve the best results of the invention, to straighten the filament and/or ribbon system in the direction of loading. The filament and/or ribbon system may be provided in the form of monofilaments, multifilaments, yarn sheets, scrims, ribbons, strips, ropes, non-woven strips, non-woven fiber webs, spiral springs or the like, which—bundled in a single layer or in multilayers and/or interlaced to form a matrix—are incorporated into the matting web such that they are fully integrated into the peakand-valley structure of the matting web. The filament and/or ribbon system may assume a monoaxial, biaxial or triaxial character.

Textile, organic, or inorganic materials having a high tensile strength and/or high resistance to deformation are suitable as materials for the filament and/or ribbon system. Glass-, aramide- and silica-filament and/or ribbon systems as well as metal-filament systems, which may also be coated, have proven particularly suitable.

One can also use as reinforcing material the synthetic polymers which are also suitable for producing the matting web. They are all filament-producing, and particularly all meltspinnable, polymers, especially polyamides, polyesters, polyolefins and polypropylene. In this case, the high tensile strength and/or high resistance to deformation is achieved by a cross section which is larger when compared with that of the filaments forming the matting web and/or by a suitable shaping of the filament and/or ribbon system.

It is also possible to introduce the filament and/or ribbon system meanderingly or in an undulating pattern into the matting web and in this way to obtain a well-defined structural elongation. When the composite matting is applied onto the surface to be coated, the latter can be stretched until the desired tensile strength or the desired resistance to deformation or a desired final dimension is attained. In the same way, the thickness of the supporting base can be adjusted in simple fashion. In particular, such a structure can be so incorporated into the filament and/or ribbon system that the composite matting can be stretched up to the length at which further lengthening is prevented by the filament and/or ribbon system. These effects can be obtained in simple fashion by a suitable combination of shaping and selection of the material within a wide range.

Preferably, the composite matting of the invention has a thickness of 2.5 to 125 mm, the thickness of the composite matting being, as a rule, selected less than the thickness of the coating compound which is to be applied to the wall.

Filament diameters of 0.1 to 3.5 mm have proven particularly suitable for the matting web having a peak-and-valley structure consisting of a plurality of synthetic polymer filaments that intersect one another at individual points and that are welded at the points of intersection.

The composite matting embodying the invention can, for example, be produced by the method disclosed in U.S. Pat. No. 4,343,807, in which the feeding of the reinforcing material can be advantageously effected during the spinning process.

As an example, the composite matting can be produced by simultaneous extrusion of a synethetic polymer melt and a melt of reinforcing material through nozzles that are arranged on a common spin-die manifold, each having a plurality of spinning orifices, in a direction substantially perpendicular to a moving catch structure arranged below the spin-die-manifold. The filaments that emerge from the spinning orifices are deposited onto said moving catch structure while intersecting one another at individual points and being welded at their points of intersection, followed by continuous removal from the moving catch structure and the depositing or winding up of the cooled finished composite matting.

In order to develop the peak-and-valey character of the composite matting, the moving catch structure is provided alternately with peaks and valleys and may, for example, be designed as a roller, drum, or endless belt. Depending on the arrangement of the peaks and valleys, a hump or undulating structure can be produced. The wave crests and troughs may essentially be aligned in the draw-off direction of the matting web or perpendicularly or obliquely thereto.

The undulated surface of the moving catch structure is cooled and has peaks, e.g., in the form of conical or pyramidal stumps, elements such as screws or nails with salient heads, or grooves that are milled into a suitable material. The matting articles are formed by depositing the filaments that emerge from the nozzles onto the moving catch structure, self-bonding with each other at random points of intersection on and between the peaks.

The spacing between the humps should be sufficiently large, so that the filaments hang down to the lowest regions of the valleys between adjacent peaks and can form welds there as well. In this way, a three-dimensional surface structure is produced that has a particularly high percentage of cavities or a low specific per unit surface weight.

The composite matting incorporating the invention has the advantage that the increase in the resistance to deformation in the direction of loading can also be achieved in simple fashion in one preferred method of manufacture by feeding the reinforcing material as a filament chain to the moving catch structure and combining it with the synthetic polymers below the nozzle outlet openings. The filament chain can, for instance, be fed tangentially to the moving catch structure in front of the spin-die manifold or therebehind. Feeding in a direction substantially parallel to the direction of spinning through the spin-die manifold or through two or more spin-die manifolds has provied particularly advantageous and, in this case, the spinning nozzles for the synthetic polymer or the feed of the filament chain can be arranged in such an angular position that the points of impingement of reinforcing material and synthetic polymer form a line on the moving catch structure. Here, it is possible, in a particularly simple fashion, to effect a thermal conditioning of the reinforcing material which may be necessary in order to achieve a uniform, snug fit to the moving catch structure.

If the reinforcement is fed behind the spin-die manifold, it may be advisable to impress the reinforcement by an appropriately coated roller onto the tacky filaments of the matting web, thus welding them.

The matting web may also be reinforced by introducing the reinforcing filaments as filling filaments substantially at right angles to the draw-off direction of the matting web and combining them with the synthetic polymer filaments forming the matting web. In this case, the filling filament can be cut off after each weft insertion, so that the reinforcing filaments are present as individual filaments. It is also possible to feed the filling filament as an endless filament.

The ratio of the filling speed to the drawing-off speed of the matting web or the filling direction determines the angular position of the reinforcing filaments in the finished matting web. If the filling speed is much higher than the drawing-off speed, a substantially perpendicular position of the reinforcing filaments with respect to the draw-off direction is obtained. If the speeds are identical, than an angular position of 45° is obtained. A uniform zigzag run of the reinforcing filaments can also be achieved by a continuous reciprocating movement of the filling material.

If the matting web has an undulating structure, it is possible, depending on the speed ratio selected, the alignment of the wave crests and wave troughs of the moving catch structure, and the type and direction of feed of the reinforcement material, to adjust at will within wide ranges the angular position between the reinforcing filaments and the wave crests and troughs. In the preferred embodiments, the reinforcing filaments are laid parallel to the wave crests and troughs in the vertex line and/or perpendicularly thereto.

The spacing between the reinforcing filaments is to be selected as a function of the desired resistance to deformation of the undulated matting web, due consideration being given to the particular physical properties of the reinforcement and of the polymer.

Suitable synthetic polymers for the undulated matting web are filament-producing polymers including, in particular, all melt-spinnable polymers and particularly polyamidjes, polyesters, polyolefins, and especially polypropylene.

The synthetic polymers and/or reinforcing filaments may contain graphite, metal particles, fillers, stabilizers, additives, carbon black, dyestuff pigments and the like.

The composite matting may be provided with an additional fastening layer which serves to fasten the composite matting to the wall. In this case, the fastening means are passed through the fastening layer. This prevents the reinforcement from being weakened by the fastening means and from being deleteriously affected in its operation.

In one preferred embodiment, the fastening layer is designed as a continuous non-woven fabric. It is also possible to provide the fastening layer in sections, e.g., in the form of non-woven strips. This is necessary for the embodiments of the composite matting that are to be stretched upon application to the wall.

The fastening layer is attached to the matting web and/or to the reinforcement by welding, sealing, sewing, stapling and/or other suitable techniques.

In FIG. 1 the reinforcing filaments 1 are combined with synthetic polyamide filaments 2 in such a way that they are laid parallel to the wave crests 3 and troughs 4.

Figure 2:
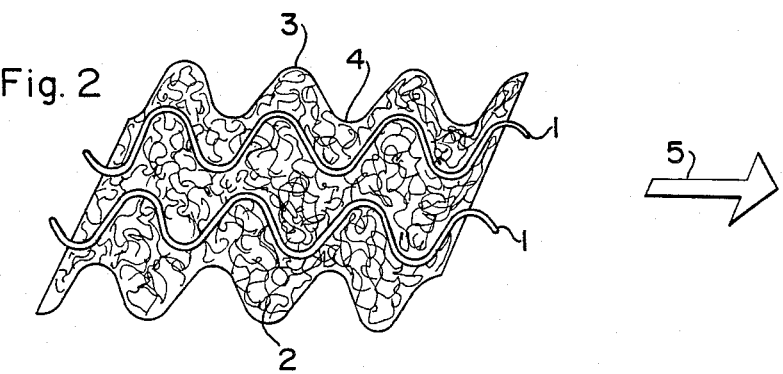

In FIG. 2 the reinforcing filaments 1 are combined with the synthetic polymer filaments 2 so that they run meanderingly and substantially at right angles to the wave crests 3 and troughs 4. Depending on the selection and dimensioning of the reinforcing filaments 1, a structure lengthening can be noted in the direction of arrow 5.

Figure 3:
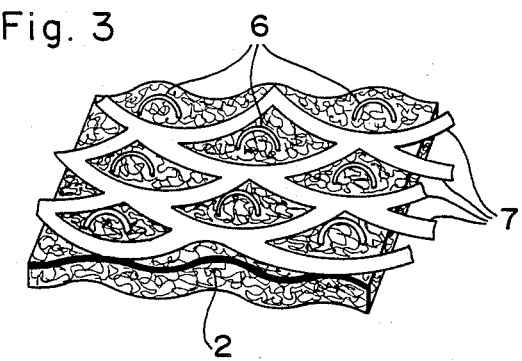

FIG. 3 shows humps 6 of polymer filaments 2 with a ribbon system 7 of synethetic polymer extending between the humps 6.

What is claimed is:

1. A non-horizontal wall comprising a nonhorizontal wall member, a composite matting attached to said wall member, and a coating compound for the wall, said composite matting being embedded in said coating compound and comprising a matting web having a peak-and-valley structure and a reinforcement, the reinforcement comprising at least one system selected from the group consisting of a filament system and a ribbon system, wherein at least one of a tensile strength and a resistance to deformation of the reinforcement is greater than a corresponding tensile strength and/or resistance to deformation of the matting web, and the reinforcement is attached in forcelocked manner to the matting web at least at a plurality of individual points.

2. The composite matting as set forth in claim 1, wherein said system is in at least one form selected from the group consisting of monofilaments, multifilaments, filament sheets, scrims, ribbons, strips, ropes, nonwoven strips, nonwoven fiber webs and spiral springs arranged in at least one arrangement selected from the group consisting of a single layer, multilayers and a matrix formed of interlaced transeverse webs.

3. The composite matting as set forth in claim 1, wherein said system is formed of at least one material selected from the group consisting of glass, aramide, silica, metal and synethic polymer.

4. The composite matting as set forth in claim 1, wherein said system is laid substantially parallel to peaks and valleys of the matting web.

5. The composite matting as set forth in claim 1, wherein said system runs in at least one direction selected from directions oblique and perpendicular to peaks and valleys of the matting web.

6. The composite matting as set forth in claim 1, wherein said system runs meanderingly.

7. The composite matting as set forth in claim 1, wherein a thickness of the composite matting is from 2.5 mm to 125 mm.

8. The composite matting as set forth in claim 1, wherein the matting web comprises a plurality of filaments of synthetic polymers which intersect one another at individual points and are bonded together at the points of intersection.

9. The composite matting as set forth in claim 8, wherein a cross section of the polymer filaments forming the matting web is from 0.1 mm to 3.5 mm.

10. The composite matting as set forth in claim 1, wherein the matting web comprises a compression-molded woven fabric.

11. The composite matting as set forth in claim 10, wherein the woven fabric is impregnated with artificial resin.

12. The composite matting as set forth in claim 1, wherein the matting web comprises a foil.

13. The composite matting as set forth in claim 12, wherein the foil has openings.

14. The composite matting as set forth in claim 1, further comprising a coating compound which is attached to at least one of the reinforcement and the matting web.

15. The composite matting as set forth in claim 14, wherein said coating layer comprises a plurality of separate sections.

16. A method of coating a non-horizontal wall, comprising:
attaching to a wall a composite matting which comprises a matting web having a peak-and-valley structure and a reinforcement, the reinforcement comprising at least one system selected from the group consisting of a filament system and a ribbon system, wherein at least one of a tensile strength and a resistance to deformation of the reinforcement is greater than a corresponding tensile strength and/or resistance to deformation of the matting web, and the reinforcement is attached in forcelocked manner to the matting web at least at a plurality of individual points;
and applying a coating material over said composite matting.

* * * * *

UNITED STATES PATENT AND TRADEMARK OFFICE
CERTIFICATE OF CORRECTION

PATENT NO. : 4,851,277
DATED : July 25, 1989
INVENTOR(S) : B. Valkenburg; S. de Graaf; J. Böhler; R. Vollbrecht It is certified that error appears in the above-identified patent and that said Letters Patent is hereby corrected as shown below:

Column 1, line 19, change "afor-" to --afore- --;
line 53, change "of" to --at--.

Column 2, line 45, change "peakand-valley" to --peak-and-valley--.

Column 3, line 29, change "synethetic" to --synthetic--;
line 42, change "peak-and-valey" to --peak-and-valley--.

Column 4, line 10, change "provied" to --proved--;
line 62, change "polyamidjes" to --polyamides--.

Claim 2, line 8, change "transeverse" to --transverse--.

Claim 14, line 2, change "further comprising a" to --wherein said--; delete "which".

UNITED STATES PATENT AND TRADEMARK OFFICE
CERTIFICATE OF CORRECTION

PATENT NO. : 4,851,277

DATED : July 25, 1989

INVENTOR(S) : B. Valkenburg; et al.,

It is certified that error appears in the above-identified patent and that said Letters Patent is hereby corrected as shown below:

Claim 15, line 1, change "14" to --1--.

line 2, change "layer" to --compound--.

Signed and Sealed this

Twenty-third Day of October, 1990

Attest:

HARRY F. MANBECK, JR.

*Attesting Officer*     *Commissioner of Patents and Trademarks*